(12) United States Patent
Noh et al.

(10) Patent No.: US 9,158,152 B2
(45) Date of Patent: Oct. 13, 2015

(54) BACKLIGHT ASSEMBLY AND LIQUID CRYSTAL DISPLAY INCLUDING THE SAME

(75) Inventors: Cheol-Yong Noh, Cheonan-si (KR); Seong-Sik Choi, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 496 days.

(21) Appl. No.: 13/080,043

(22) Filed: Apr. 5, 2011

(65) Prior Publication Data

US 2011/0304794 A1   Dec. 15, 2011

(30) Foreign Application Priority Data

Jun. 9, 2010   (KR) ........................ 10-2010-0054434

(51) Int. Cl.
*G02F 1/1333* (2006.01)
*G02F 1/1335* (2006.01)

(52) U.S. Cl.
CPC ................................ *G02F 1/133608* (2013.01)

(58) Field of Classification Search
CPC ................ G02F 1/133608; G02F 1/133308; G02F 1/1336; G02F 1/133603; G02F 2001/133314; G02B 6/0085; G02B 6/0016
USPC ..................................................... 349/58, 65
See application file for complete search history.

(56) References Cited

U.S. PATENT DOCUMENTS

| | | | |
|---|---|---|---|
| 8,154,702 B2* | 4/2012 | Kim ............................... | 349/150 |
| 8,350,987 B2* | 1/2013 | Yang et al. ...................... | 349/64 |
| 2006/0044746 A1* | 3/2006 | Kim et al. ...................... | 361/681 |
| 2008/0232134 A1* | 9/2008 | Weng et al. .................... | 362/612 |
| 2008/0303971 A1* | 12/2008 | Lee et al. ........................ | 349/58 |
| 2009/0290088 A1* | 11/2009 | Kwak ............................. | 349/58 |
| 2010/0123851 A1* | 5/2010 | Mo et al. ........................ | 349/58 |
| 2011/0085107 A1* | 4/2011 | Noh et al. ....................... | 349/61 |

* cited by examiner

*Primary Examiner* — Edward Glick
*Assistant Examiner* — David Chung
(74) *Attorney, Agent, or Firm* — Cantor Colburn LLP

(57) ABSTRACT

A liquid crystal display includes a backlight assembly. The backlight assembly includes a light guide plate, a light source module which emits light to a side surface of the light guide plate, and a housing which accommodates the light guide plate and the light source module. The light source module includes a printed circuit board on which a plurality of a point light source is mounted, and a light source fixing board which supports the printed circuit board. The housing includes a bottom portion on which the light guide plate is placed, and a fixing portion which extends from an edge of the bottom portion. An extension portion of the light source fixing board, which is adjacent to a corner of the light guide plate, and an end of the fixing portion of the housing, are coupled to a reinforcing member.

13 Claims, 9 Drawing Sheets

BACKLIGHT ASSEMBLY AND LIQUID CRYSTAL DISPLAY INCLUDING THE SAME

This application claims priority to Korean Patent Application No. 10-2010-0054434 filed on Jun. 9, 2010, and all the benefits accruing therefrom under 35 U.S.C. §119, the disclosure of which is incorporated herein by reference in its entirety.

BACKGROUND OF THE INVENTION

1. Field of the Invention

The invention relates to a backlight assembly and a liquid crystal display including the same.

2. Description of the Related Art

Liquid crystal displays ("LCDs") are one of the most widely used types of flat panel displays ("FPDs"). Generally, an LCD includes two substrates having electrodes, and a liquid crystal layer interposed between the substrates. In an LCD, voltages are applied to the electrodes to rearrange liquid crystal molecules of the liquid crystal layer, thereby controlling the amount of light that passes through the liquid crystal layer.

Since the light transmittance of liquid crystal molecules is changed according to the orientation and intensity of an applied electric field, LCDs require light to display images. Examples of light sources used in LCDs include light-emitting diodes ("LEDs"), cold cathode fluorescent lamps ("CCFLs"), and flat fluorescent lamps ("FFLs").

The thickness of a conventional LCD can be reduced to produce an ultra-slim LCD. In this case, however, the rigidity of the conventional LCD is also reduced at corner portions thereof.

BRIEF SUMMARY OF THE INVENTION

An exemplary embodiment of the invention provides a backlight assembly including corner portions with increased rigidity.

An exemplary embodiment of the invention also provides a liquid crystal display ("LCD") including the backlight assembly.

In an exemplary embodiment of the invention, there is provided a backlight assembly including a light source module, a housing and a reinforcing member. The light source module includes a plurality of a point light source which is disposed adjacent to a side of a light guide member, a support portion which fixes the point light sources in place, a base portion which extends from an edge of the support portion and is overlapped by the light guide member, and an extension portion which is adjacent to a corner of the light guide member and extends from an end of the base portion. The housing includes a bottom portion which supports the light guide member and a fixing portion which extends from an edge of the bottom portion. The reinforcing member is coupled and fixed to each of the extension portion of the light source module and the fixing portion of the housing.

In another exemplary embodiment of the invention, there is provided a backlight assembly including a light source module including a plurality of point light sources and a light source fixing board which fixes the point light sources in place, a housing located on the light source fixing board and inserted and fixed to the light source fixing board, and a reinforcing member disposed adjacent to at least one corner of the housing, interposed between the light source fixing board and the housing, and coupled and fixed to each of the light source fixing board and the housing.

In another exemplary embodiment of the invention, there is provided an LCD including a backlight assembly providing light, and a liquid crystal display panel disposed on the backlight assembly and displaying an image by using the light. The backlight assembly includes a light source module, a housing and a reinforcing member. The light source module includes a plurality of a point light source which is disposed adjacent to a side of a light guide member, a support portion which fixes the point light sources in place, a base portion which extends from an edge of the support portion and is overlapped by the light guide member, and an extension portion which is adjacent to a corner of the light guide member and extends from an end of the base portion. The housing includes a bottom portion which supports the light guide member and a fixing portion which extends from an edge of the bottom portion. The reinforcing member is coupled and fixed to each of the extension portion of the light source module and the fixing portion of the housing.

BRIEF DESCRIPTION OF THE DRAWINGS

The above and other features of the invention will become more apparent by describing in detail exemplary embodiments thereof with reference to the attached drawings, in which.

DETAILED DESCRIPTION OF THE INVENTION

Features of the invention and methods of accomplishing the same may be understood more readily by reference to the following detailed description of exemplary embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will be defined by the appended claims. In the drawings, sizes and relative sizes of layers and regions may be exaggerated for clarity.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the attached drawings.

Exemplary embodiments of a backlight assembly and a liquid crystal display ("LCD") including the same, according to the invention will now be described in detail with reference to FIGS. 1 through 7.

Figure 1:
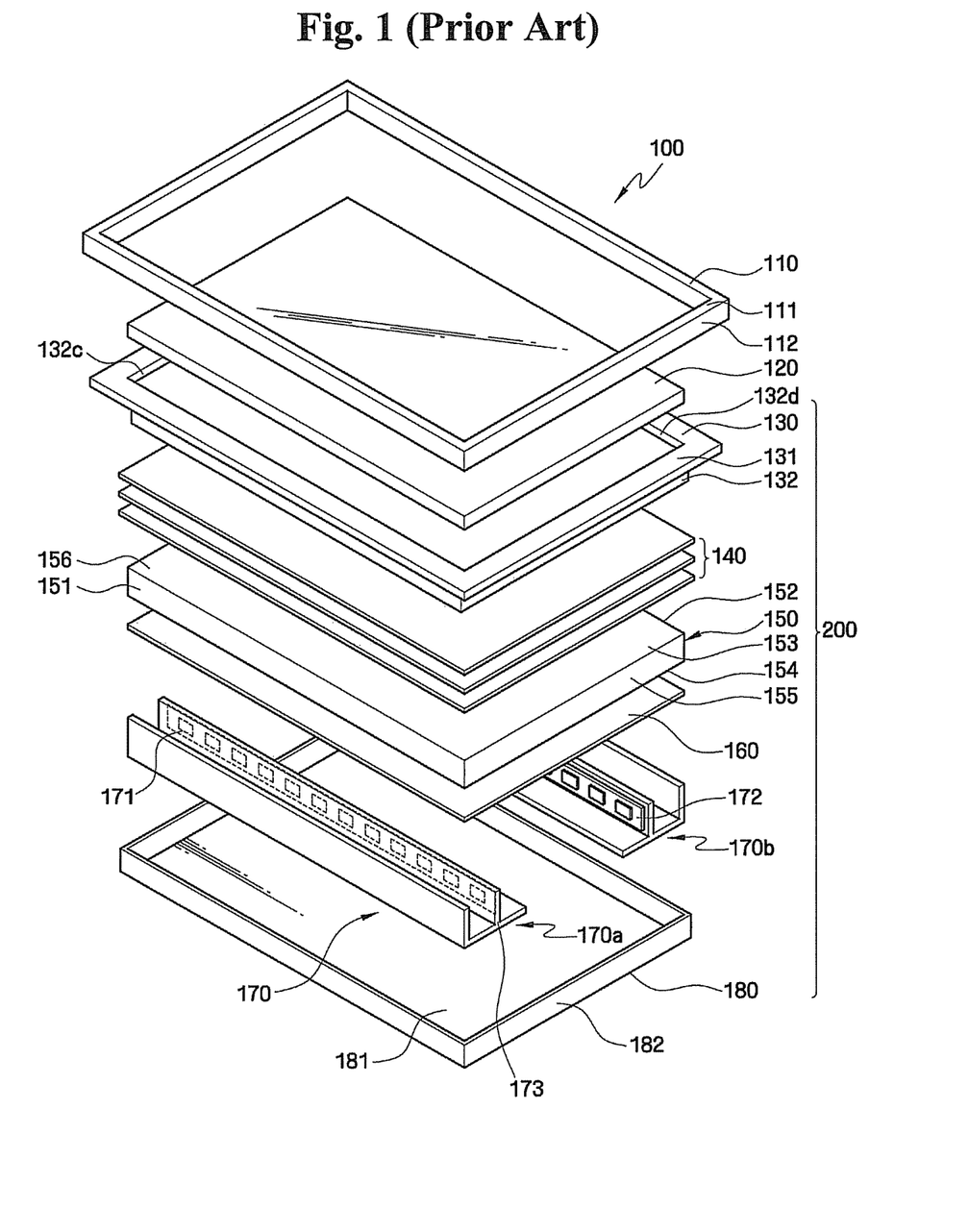
FIG. 1 is a perspective view of a conventional liquid crystal display ("LCD") including a liquid crystal display panel and an edge-type backlight assembly.
Figure 2:
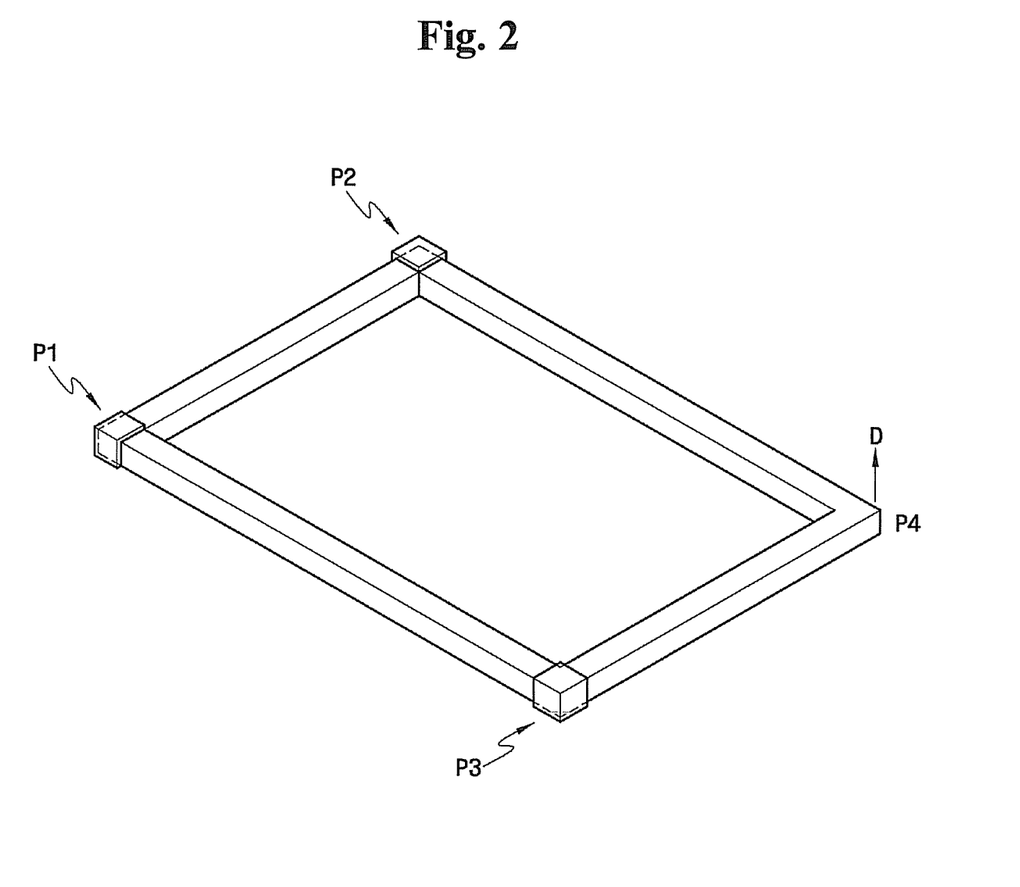
FIG. 2 is a schematic diagram illustrating an exemplary embodiment of a method of testing a rigidity of an LCD.

FIG. 1 is a perspective view of a conventional LCD 100 including a liquid crystal display panel 120 and an edge-type backlight assembly 200. The illustration in FIG. 1 is to promote an understanding of a backlight assembly and an LCD including the same, according to the invention. FIG. 2 is a schematic diagram illustrating an exemplary embodiment of a method of testing the rigidity of the LCD 100.

Referring to FIG. 1, the edge-type backlight assembly 200 included in the LCD 100 includes a light guide plate ("LGP") 150, a light source module 170, and a housing 180.

The LGP 150 includes an incident surface 151 on which light emitted from a first light source module 170*a* that is to be described later is incident, a facing surface 152 which faces (e.g., opposes) the incident surface 151, an output surface 153 which connects the incident surface 151 to the facing surface 152 and from which light is output to the liquid crystal display panel 120, and a reflective surface 154 which faces (e.g., opposes) the output surface 153. The LGP 150 further includes first and second side surfaces 155 and 156 which face (e.g., oppose) each other and connect the facing surface 152, the output surface 153, and the reflective surface 154 to each other.

When viewed from above the output surface 153 (e.g., in a plan view), the LGP 150 is shaped like a quadrangle with two long (e.g., longitudinal) sides and two short (e.g., transverse) sides. In addition, the LGP 150 may be, but is not limited to, a flat (e.g., planar) LGP having a uniform thickness in a direction from the incident surface 151 to the facing surface 152, such that light incident from the light source module 170 is uniformly distributed over an entire area of the output surface 153.

The light source module 170 includes the first light source module 170*a* and a second light source module 170*b* which are respectively disposed adjacent to the long sides of the LGP 150, as shown in FIG. 1. The first and second light source modules 170*a* and 170*b* have the same structure and are symmetrical to each other with respect to the LGP 150. For convenience, the configuration of only the first light source module 170*a* will hereinafter be described.

The first light source module 170*a* includes a plurality of a point light source 171, a printed circuit board ("PCB") 172 on which the point light sources 171 are mounted, and a light source fixing board 173 which fixes the PCB 172 in place. The point light sources 171 may be light-emitting diodes ("LEDs") made of a compound semiconductor.

When receiving a driving voltage from an external source (e.g. outside of the light source module 170), the point light sources 171 emit white light to the incident surface 151 of the LGP 150. Here, the point light sources 171 may emit white light by combining yellow phosphors with blue LEDs, or may emit white light by grouping red, green and blue LEDs together and mixing the three primary colors.

The housing 180 of the backlight assembly 200 includes a quadrangular planar bottom portion 181, and a plurality of a side portion 182 which extends from short and long edges of the bottom portion 181 in a direction perpendicular to the bottom portion 181, respectively. The light source module 170, a reflective sheet 160, the LGP 150, and optical sheets 140 are sequentially accommodated in a housing space formed by the bottom portion 181 and the side portions 182.

FIG. 2 is a schematic diagram of a frame of the LCD 100. The frame of the LCD 100 is a quadrangular frame excluding an image display area of the liquid crystal display panel 120. Major components of the frame of the LCD 100 include the LGP 150 and the housing 180 as well as a top cover 110, the liquid crystal display panel 120, and a mold frame 130 which will be described later. These components are coupled to each other to reduce or effectively prevent deformation of the frame of the LCD 100 by an external force such as external impact or vibrations. The contribution of each component to the rigidity of the frame of the LCD 100, that is, the degree to which each component resists deformation of the frame of the LCD 100 by an external force, will now be described.

Table 1 below shows the result of testing the rigidity of corner portions of the frame of the LCD 100, which are particularly vulnerable to an external force.

TABLE 1

|  | Displacement in millimeter (mm) | Rigidity ratio (%) |
|---|---|---|
| Reference example | 30.3 | — |
| Example 1 (liquid crystal display panel removed) | 39.7 | 23.7 |
| Example 2 (top cover removed) | 34.2 | 11.5 |
| Example 3 (housing removed) | 45.8 | 51.2 |
| Example 4 (mold frame removed) | 31.5 | 3.7 |
| Example 5 (LGP removed) | 33.1 | 8.4 |

To test rigidity, referring to FIG. 2, three (P1 through P3) of four (P1 through P4) corners of the quadrangular frame of the LCD 100 were fixed in place, and an external force of, e.g., 50 newtons (N) was applied to the other corner (P4) in the opposite direction of gravity. Accordingly, the corner to which the external force was applied was deformed in the opposite direction of gravity. The rigidity of the corner, that is, the degree to which the corner was bent, was identified by checking the displacement of the corner.

Table 1 shows a displacement and a rigidity ratio measured by repeating a rigidity test by removing each of the major components from the LCD 100. The rigidity ratio refers to a ratio of a displacement in each of Examples 1 through 5 to a displacement in the reference example, in which all of the major components are included in the LCD 100. A higher rigidity ratio denotes a greater contribution of a corresponding removed component to the rigidity of the LCD 100.

It can be understood from Table 1 that more than 80% of the rigidity of the frame of the LCD 100 is obtained from the top cover 110, the liquid crystal display panel 120, and the housing 180. Therefore, a reduction in the thickness of the LCD 100, that is, the distance between an upper surface of the top cover 110 and a lower surface of the housing 180, results in a reduction in thicknesses of the major components of the frame of the LCD 100, which, in turn, significantly decreases the rigidity of the LCD 100. In one exemplary embodiment, for example, the thicknesses of the top cover 110, the LGP 150, and the housing 180 included in the LCD 100 may be reduced to produce an ultra-slim LCD, according to an embodiment of the invention.

The ultra-slim LCD according to the invention includes a rigidity-reinforcing member to solve problems caused by reducing the thickness of the LCD 100 which in turn decreases the rigidity of the LCD 100.

Hereinafter, an exemplary embodiment of an edge-type backlight assembly 201 of an LCD 101 according to the invention will be described in detail with reference to FIG. 3.

An LGP 150 according to the illustrated exemplary embodiment may be configured to have surfaces identical to those of the LGP 150 included in the backlight assembly 200 of FIG. 1. That is, the LGP 150 may include an incident surface 151 on which light emitted from a first light source module 170a is incident, a facing surface 152 which faces (e.g. opposes) the incident surface 151, an output surface 153 which connects the incident surface 151 to the facing surface 152 and from which light is output to a liquid crystal display panel 120, and a reflective surface 154 which faces (e.g., opposes) the output surface 153. The LGP 150 further includes first and second side surfaces 155 and 156 which connect the facing surface 152, the output surface 153, and the reflective surface 154 to each other, and the first and second side surfaces 155 and 156 face (e.g., oppose) each other.

When viewed from above the output surface 153 (e.g., in a plan view), the LGP 150 is shaped like a quadrangle with two long sides and two short sides. In addition, the LGP 150 may be, but is not limited to, a flat LGP having a uniform thickness in a direction from the incident surface 151 to the facing surface 152, such that light incident from a light source module 170 is uniformly distributed over the entire area of the output surface 153.

In another exemplary embodiment of the invention, the LGP 150 may be a wedge-type LGP whose thickness is gradually reduced in the direction from the incident surface 151 to the facing surface 152. In this case, the light source module 170 may be placed on one of the long sides of the LGP 150.

To make the LCD 101 ultra-slim, the thickness of the LGP 150 according to the illustrated embodiment may be reduced to, e.g., half or less than half the thickness of the conventional LGP 150. Since a reduction in the thickness of the LGP 150 results in a reduction in an overall thickness of the LCD 101, the LCD 101 can be made ultra-slim. However, a reduction in the thickness of the LGP 150 also results in a reduction in the rigidity of corner portions of the LCD 101, and a reduction in the rigidity of the corner portions of the LCD 101 is an important cause of a reduction in product reliability, for example, causing warping defects in the assembling or transporting process of the LCD 101.

To reduce or effectively prevent the reduction in rigidity, the light source module 170, a housing 180, and a reinforcing member 190 of the backlight assembly 201 according to the illustrated embodiment are configured as follows.

Figure 4A:
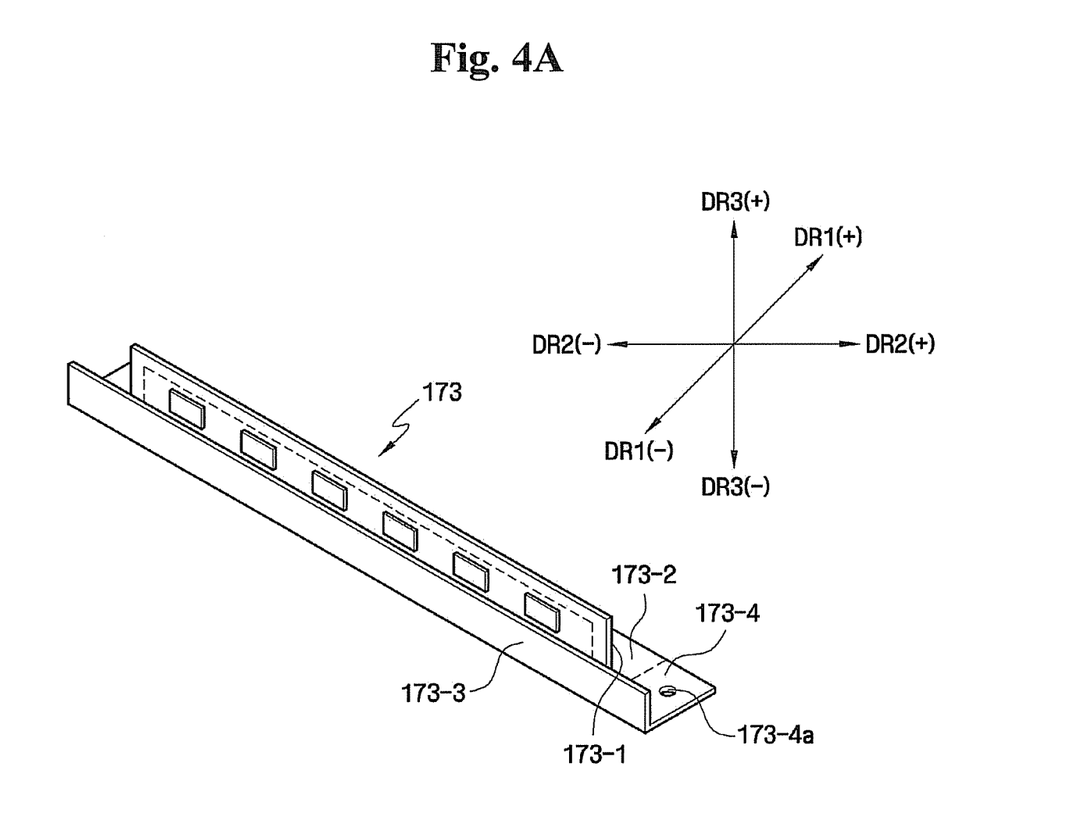
FIGS. 4A through 4C are views illustrating an area 'A' of FIG. 3. Specifically, FIGS. 4A through 4C respectively are perspective, cross-sectional, and plan views of an exemplary embodiment of a light source fixing board.
Figure 4B:
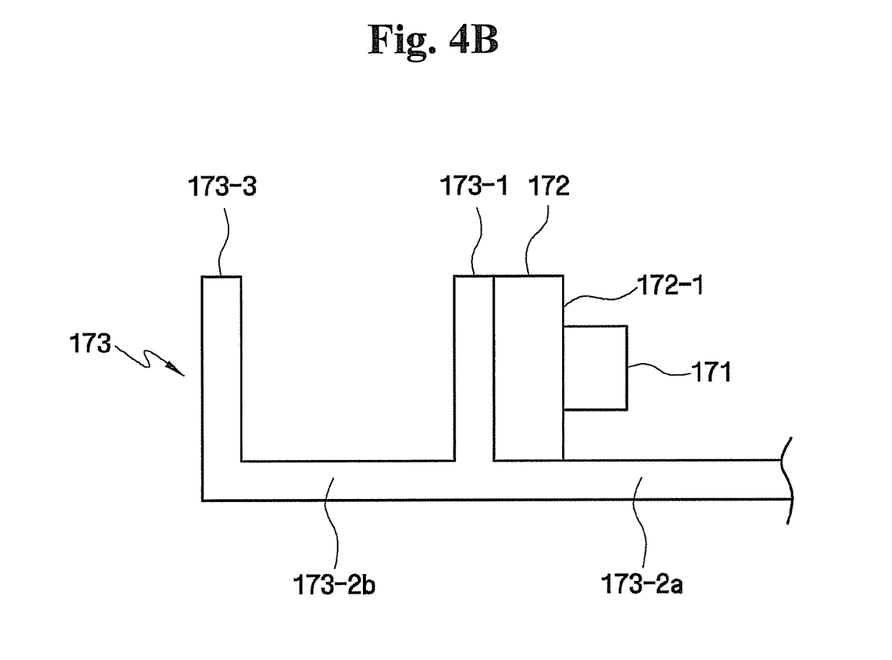
Figure 4C:
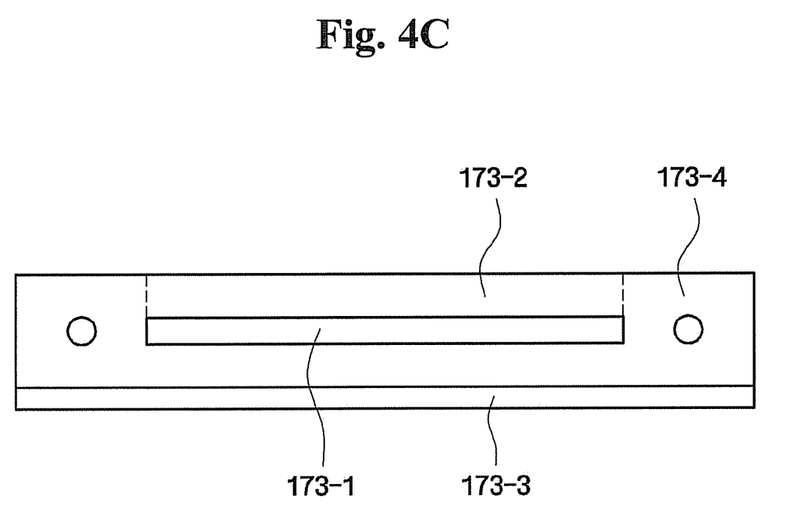
Figure 5A:
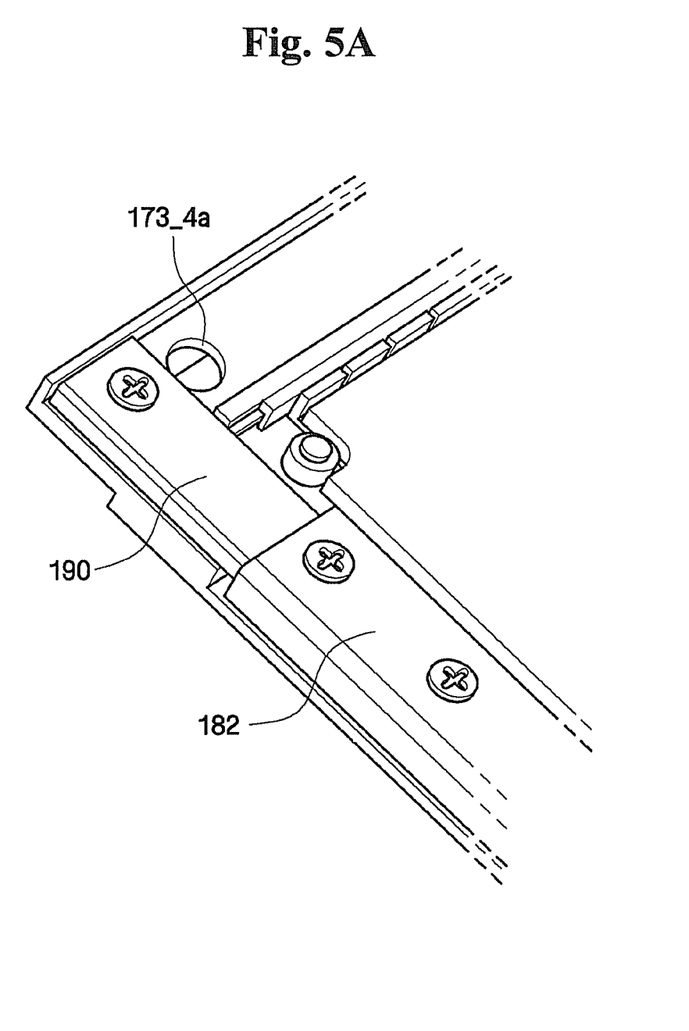
FIG. 5A is a perspective view of area 'A' of the LCD of FIG. 3 which has been assembled.
Figure 5B:
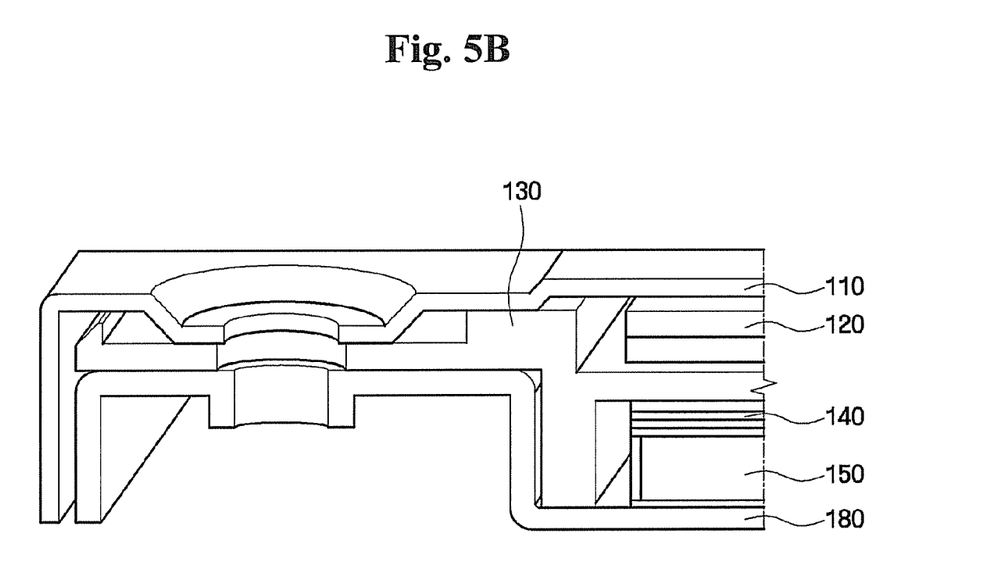
FIG. 5B is a cross-sectional view of the assembled area 'A' in FIG. 5A.
Figure 6:
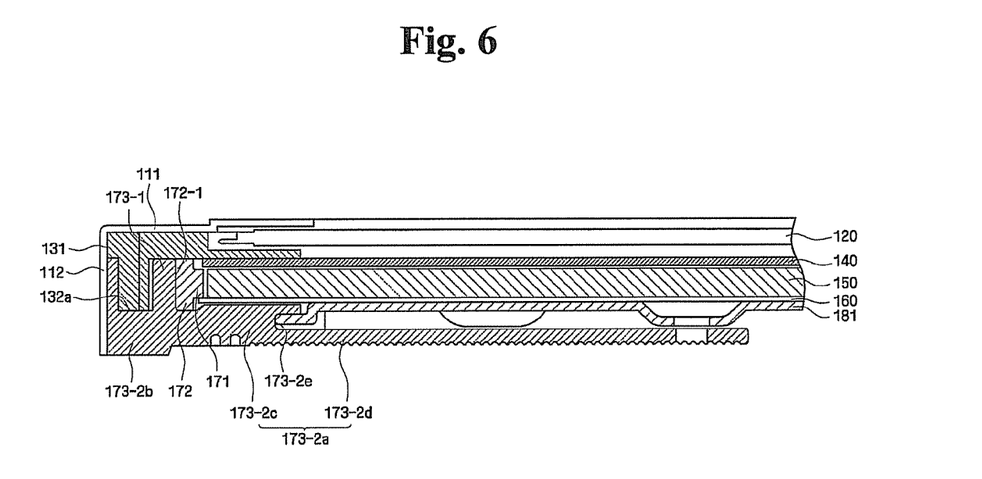
FIG. 6 is a cross-sectional view taken along line I-I' of FIG. 3.
Figure 7:
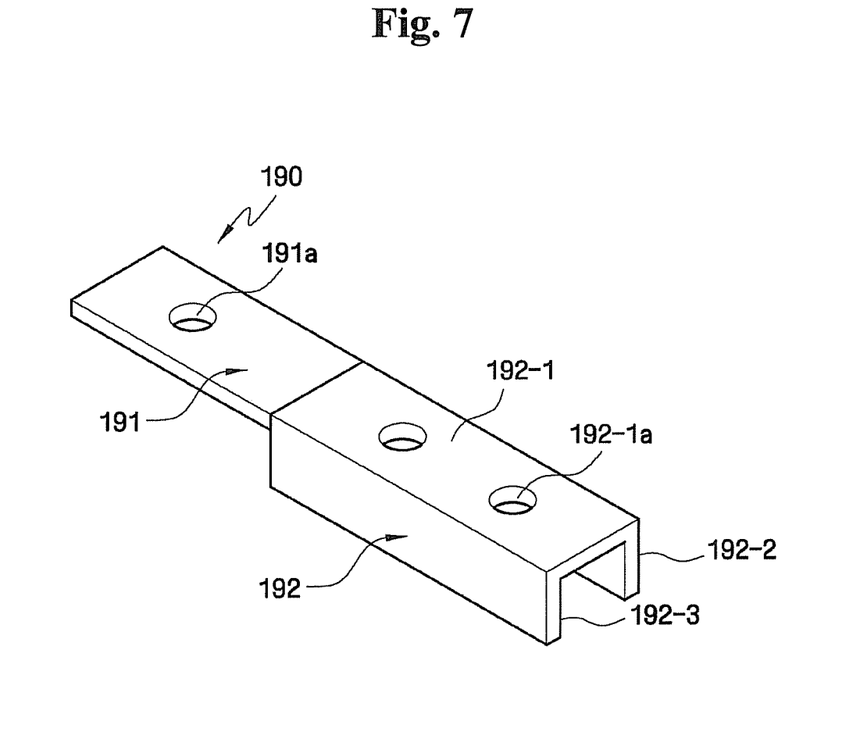
FIG. 7 is a perspective view of an exemplary embodiment of a reinforcing member shown in FIG. 3.

First, the configuration of the light source module 170 will be described with reference to FIGS. 3 through 7. FIG. 3 is an exploded perspective view of the exemplary embodiment of the LCD 101 according to the invention. FIGS. 4A through 4C are views illustrating an area 'A' of FIG. 3. Specifically, FIGS. 4A through 4C respectively are perspective, cross-sectional, and plan views of a light source fixing board 173. FIG. 5A is a perspective view of the area 'A' of the LCD 101 of FIG. 3 which has been assembled. FIG. 5B is a cross-sectional view of the assembled area 'A' in FIG. 5A. FIG. 6 is a cross-sectional view taken along line I-I' of FIG. 3. FIG. 7 is a perspective view of an exemplary embodiment of a reinforcing member 190 shown in FIG. 3.

The backlight assembly 201 according to the illustrated exemplary embodiment includes the light source module 170, the housing 180, the reinforcing member 190, and the like.

The light source module 170 may include a plurality of a point light source 171 and the light source fixing board 173 which fixes the point light sources 171 in place. A portion of the housing 180 may be located on and overlapping a portion of the light source fixing board 173, and may be inserted and fixed to the light source fixing board 173. The reinforcing member 190 may be placed adjacent to at least one corner of the housing 180, interposed between portions of the light source fixing board 173 and the housing 180, and coupled and fixed to both the light source fixing board 173 and the housing 180. The reinforcing member 190 is configured to increase the rigidity of corner portions of the LCD 101.

Figure 3:
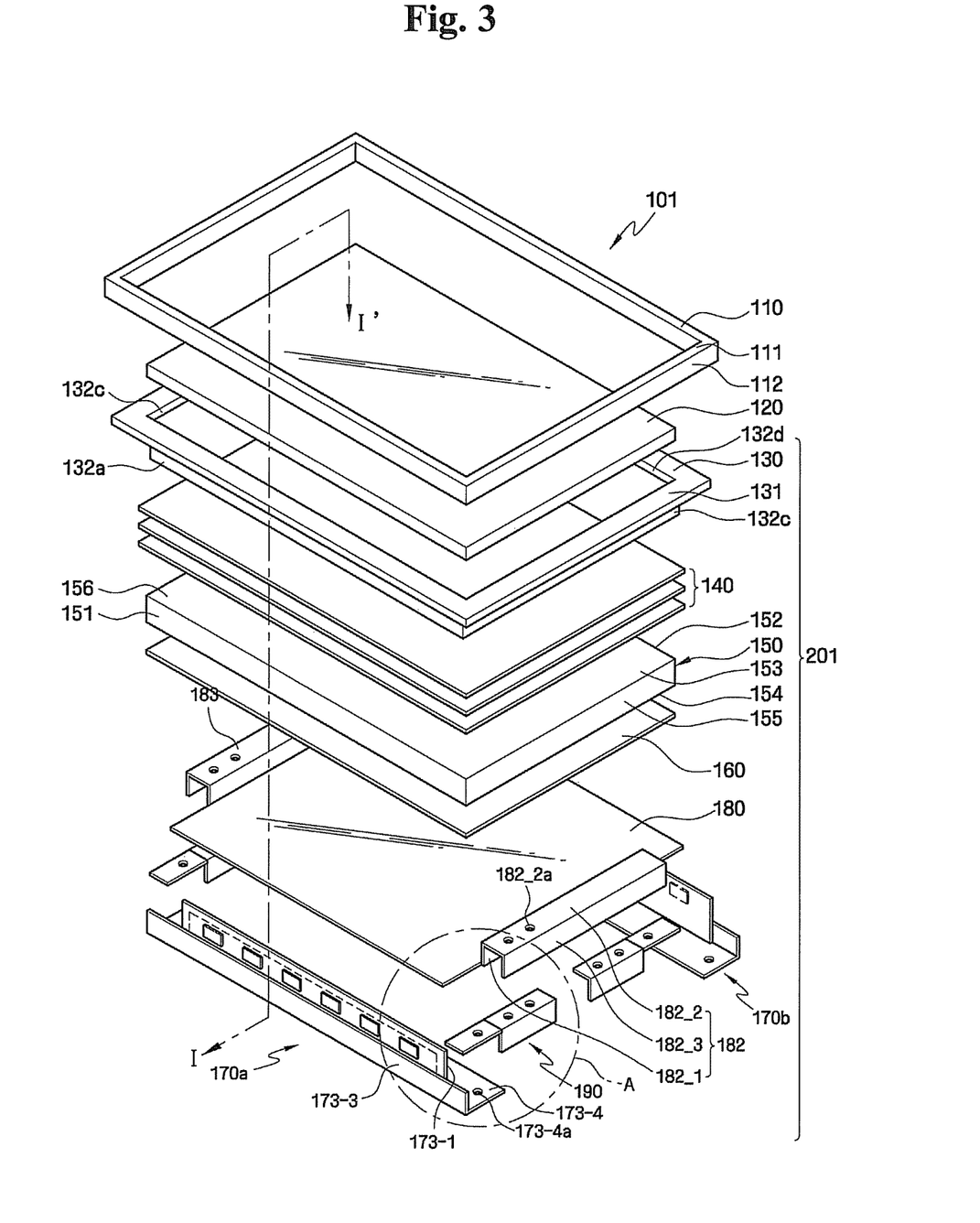
FIG. 3 is an exploded perspective view of an exemplary embodiment of an LCD, according to the invention.

The light source module 170 includes a first light source module 170a and a second light source module 170b which are respectively disposed adjacent to the long sides of the LGP 150 as shown in FIG. 3. The first and second light source modules 170a and 170b have the same structure and are symmetrical to each other with respect to the LGP 150. For convenience, the configuration of only the first light source module 170a will hereinafter be described.

The first light source module 170a includes the point light sources 171, a PCB 172 on which the point light sources 171 are mounted, and the light source fixing board 173 which fixes the PCB 172 in place. The point light sources 171 may be LEDs made of a compound semiconductor.

When receiving a driving voltage from an external source, the point light sources 171 emit white light to the incident surface 151 of the LGP 150. The point light sources 171 may emit white light by combining yellow phosphors with blue LEDs, or may emit white light by grouping red, green and blue LEDs together and mixing the three primary colors. In the illustrated exemplary embodiment, LEDs containing phosphors will be described as an example of the point light sources 171.

The PCB 172, on which the point light sources (e.g., LEDs) 171 are mounted, applies a driving voltage to each of the point light sources 171. The PCB 172 according to the illustrated exemplary embodiment is shaped like a quadrangle and includes long sides which are parallel to long sides of the incident surface 151, and short sides which are orthogonal to the long sides of the incident surface 151. The point light sources 171 are mounted on a mounting portion 172-1 of the PCB 172 and are arranged at predetermined intervals along the long sides of the PCB 172 to uniformly provide white light to the incident surface 151. The PCB 172 includes a circuit pattern (not shown) to electrically connect a terminal of each of the point light sources 171 to an external power supply circuit.

Referring to FIGS. 3 and 4A through 4C, the light source fixing board 173 includes a support portion 173-1, a base portion 173-2, a coupling portion 173-3, and an extension portion 173-4. The light source fixing board 173 includes a metal material having superior thermal conductivity, such as aluminum. The components of the light source fixing board 173 are formed as a single unitary indivisible piece, such as by using extrusion molding or press working.

The base portion 173-2 is shaped like a quadrangle having a predetermined thickness, and extends parallel to a long side of the LGP 150.

The support portion 173-1 fixes the PCB 172, on which the point light sources 171 are mounted, at a position adjacent to the incident surface 151 of the LGP 150. The PCB 172 is directly on a surface of the support portion 173-1. To this end, the support portion 173-1 extends from an area of an upper surface of the base portion 173-2 in a direction perpendicular to the upper surface of the base portion 173-2, and has a same width taken from the upper surface of the base portion 173-2 to an uppermost surface of the support portion 173-1, as the rear of the PCB 172. The base portion 173-2 may be divided into a first base portion 173-2a and a second base portion 173-2b by the support portion 173-1.

The first base portion 173-2a extends from the support portion 173-1 in the direction (hereinafter, referred to as a first direction) of the incident surface 151 of the LGP 150. A reflective sheet 160 and the reflective surface 154 of the LGP 150, which will be described later, are sequentially placed on the first base portion 173-2a to overlap each other.

In addition, the first base portion 173-2a includes a step part 173-2c and a base part 173-2d as shown in FIG. 6 in order to increase the heat transfer efficiency of the light source fixing board 173 which transfers heat generated by the point light sources 171 to the outside.

The light source fixing board 173 according to the illustrated exemplary embodiment may be structured to transfer the heat directly to the outside without using the housing 180 as a medium. To this end, upper surfaces of the step part 173-2c and the base part 173-2d of the first base portion 173-2a may form a step difference, e.g., since they are not coplanar with each other, as illustrated in FIG. 6.

The step part 173-2c includes an insertion groove 173-2e in a side surface thereof, so that the light source fixing board 173 is placed outside an edge of a bottom portion 181 of the housing 180, to form a long side of the frame of the backlight assembly 201. The insertion groove 173-2e may extend along (e.g., parallel) the long side of the LGP 150, and may be an engraved groove that is indented into the step part 173-2c to allow an edge of the bottom portion 181 to be inserted thereinto. The shape of the insertion groove 173-2e of the step part 173-2c is not limited to the illustrated embodiment and can vary widely as long as it enables the insertion groove 173-2e to be securely coupled to the edge of the bottom portion 181.

The base part 173-2d extends a predetermined distance from the step part 173-2c in the first direction. A plurality of a fixing hole is extended into the upper surface of the base part 173-2d, for coupling to the bottom portion 181 of the housing 180 to the light source fixing board 173. A lower surface of the first base portion 173-2a may include grooves on an entire of the lower surface, to facilitate heat transfer and diffusion.

The second base portion 173-2b extends from the support portion 173-1 in the opposite direction of the first direction. A first side portion 132a of a mold frame 130, which will be described later, is mounted on and directly contacting an upper surface of the second base portion 173-2b, as illustrated in FIG. 6. Referring to FIG. 4A through 4C and FIG. 6, the light source fixing board 173 further includes the coupling portion 173-3 which extends from an edge of the second base portion 173-2b in the direction of (e.g., parallel to) a frame portion 131 of the mold frame 130, and is coupled to one of side portions 112 of the top cover 110.

The extension portion 173-4 extends from an end of the support portion 173-1 in a second direction perpendicular to the first direction, and includes a through hole 173-4a for coupling to the reinforcing member 190 which will be described later. The extension portion 173-4 is the endmost portion of the base portion 173-2, at each of opposing ends of the light source fixing board 173.

The through hole 173-4a of the extension portion 173-4 may be at a position adjacent to the coupling portion 173-3, e.g., near an outer edge of the light source fixing board 173, in order to reinforce the rigidity of the corner portions of the LCD 101. The through hole 173-4a partially or completely penetrates a thickness of the extension portion 173-4, and is spaced apart from outer edges of the extension portion 173-4, such that the through hole 173-4a is an enclosed opening solely defined by the extension portion 173-4.

The housing 180 includes the quadrangular bottom portion 181 and fixing portions 182 and 183, which are connected to short sides of the bottom portion 181, thereby providing the housing space. In the housing space of the housing 180, the light source module 170, the reflective sheet 160, the LGP 150, and optical sheets 140 are sequentially accommodated.

The housing 180 may include a plurality of a through hole 182-2a extended in the fixing portion 182, or in an area of the bottom portion 181, which is adjacent to a long edge of the bottom portion 181, for coupling to the top cover 110, the mold frame 130, and the light source module 170 to each other. The through hole 182-2a partially or completely penetrates a thickness of the first connecting portion 182-2, and is spaced apart from outer edges of the first connecting portion 182-2, such that the through hole 182-2a is an enclosed opening solely defined by the first connecting portion 182-2.

The housing 180 may include a metal material such as aluminum or stainless steel, to reduce or effectively prevent the LCD 101 from being warped by an external force such as external impact or vibrations. As described above, the housing 180 is an important structure in maintaining the rigidity of the LCD 101, and a configuration of the housing can be modified in various ways to reinforce the rigidity of the LCD 101. In one exemplary embodiment, for example, protrusions and recesses (not shown) can be on the entire surface of the bottom portion 181 of the housing 180, or indented grooves (not shown) longitudinally extending along (e.g., parallel to) a short side of the bottom portion 181 may be arranged at predetermined intervals.

Referring to FIG. 3, the fixing portion 182 of the housing 180 includes a first bent portion 182-1 which extends directly from a short edge of the bottom portion 181 in the direction of the top cover 110, a second bent portion 182-3 which faces and is parallel to the first bent portion 182-1, and a first connecting portion 182-2 which connects an end of the first bent portion 182-1 to an end of the second bent portion 182-3. That is, each of the fixing portions 182 and 183 of the housing 180, which consists of the first bent portion 182-1, the first connecting portion 182-2, and the second bent portion 182-3, is formed in a ' ⌐ ' shape and reinforces the rigidity of a long side of the frame of the LCD 101.

One or more through holes 182-2a may be extended into or completely through an end of the first connecting portion 182-2 adjacent to the first light source module 170a, for coupling to the reinforcing member 190 which will be described later. The housing 180, the LGP 150, and the top cover 110 included in the ultra-slim LCD 101 according to the illustrated exemplary embodiment are significantly thinner than those in a conventional LCD. Therefore, the fixing portions 182 and 183 of the housing 180 may have a ' ⌐ ' structure in order to secure the rigidity of the thinner frame of the LCD 101. The first bent portion 182-1, the first connecting portion 182-2 and the second bent portion 182-3 collectively form a single unitary indivisible member. In an exemplary embodiment, the bottom portion 181 and the fixing portions 182 and 183 of the housing 180 may be simultaneously formed using a press method.

The reinforcing member 190 is coupled to the light source module 170, and the fixing portions 182 and 183 of the housing 180 which respectively form long and short sides of the frame of the LCD 101. This coupling between the reinforcing member 190, the light source module 170 and the fixing portions 182 and 183 reinforces the rigidity of the corner portions of the frame of the ultra-slim LCD 101 which are most vulnerable to stress by an external force.

The reinforcing member 190 may include the same material (e.g., aluminum) as the light source module 170 and the housing 180. In addition, the reinforcing member 190 as a single unitary indivisible member may be formed as shown in FIG. 7, by using extrusion molding. The reinforcing member 190 may be a separate member from the housing 180 and the light source module 170. When a relatively inexpensive manufacturing method, such as a press method, is used, the reinforcing member 190 may include a zinc-coated steel sheet.

The reinforcing member 190 may include at a first end, a first coupling portion 191 which is coupled directly to the extension portion 173-4 of the first light source module 170a, and at a second end, a second coupling portion 192 which is coupled directly to an end of the fixing portion 182 of the housing 180.

The first coupling portion 191 is directly on an upper surface of the extension portion 173-4 of the first light source module 170a to overlap the extension portion 173-4 and contact the upper surface of the extension portion 173-4. The first coupling portion 191 may include a coupling hole 191a to be used in coupling and fixing the reinforcing member 190 to the extension portion 173-4. The coupling hole 191a partially or completely penetrates a thickness of the first coupling portion 191, and is spaced apart from outer edges of the first coupling portion 191, such that the coupling hole 191a is an enclosed opening solely defined by the first coupling portion 191.

The coupling hole 191a of the first coupling portion 191 is at a position corresponding to (e.g., aligned with) the position of the through hole 173-4a of the extension portion 173-4. A fixing member, such as a screw, is inserted into the coupling hole 191a as shown in FIG. 5A, thereby coupling the reinforcing member 190 to the first light source module 170a. In exemplary embodiments, the fixing member coupled to the coupling hole 191a may be a screw or a rivet.

The second coupling portion 192 of the reinforcing member 190 extends from an end of the first coupling portion 191 and is coupled to an end of the fixing portion 182 of the housing 180 facing the light source module 170a. The second coupling portion 192 may have the same shape or profile as the fixing portion 182 of the housing 180. That is, the second coupling portion 192 includes a second connecting portion 192-1 which extends horizontally from an end of the first coupling portion 191, and a third bent portion 192-2 and a fourth bent portion 192-3 which extend a predetermined distance from both edges of the second connecting portion 192-1 in the direction of the bottom portion 181 of the housing 180, e.g., toward a rear of the LCD 101. The first coupling portion 191 and the second coupling portion 192 collectively form the single unitary indivisible reinforcing member 190.

Outer surfaces of the third and fourth bent portions 192-2 and 192-3 of the second coupling portion 192 respectively contact inner surfaces of the first and second bent portions 182-1 and 182-3 of the fixing portion 182 of the housing 180. To fit over the second coupling portion 192, for example, the fixing member 182 may have a larger distance between the first and second bent portions 182-1 and 182-3, than the reinforcing member 190 includes between the third and fourth bent portions 192-2 and 192-3. Accordingly, the fixing portion 182 of the housing 180 surrounds the second coupling portion 192. The fixing portion 182 of the housing 180 may not overlap the first coupling portion 191 of the reinforcing member 190.

The shape of the second coupling portion 192 varies according to the shape of the fixing portion 182 of the housing 180 and is not limited to the illustrated embodiment of the invention.

Like the first coupling portion 191, the second coupling portion 192 includes one or more coupling holes 192-1a so as to be coupled to the fixing portion 182 of the housing 180.

The coupling holes 192-1a are at positions corresponding respectively to (e.g., aligned with) those of the through holes 182-2a in the first connecting portion 182-2 of the fixing portion 182 of the housing 180, such that fixing members, such as screws, are inserted into to extend completely through the coupling holes 192-1a and the through holes 182-2a. The coupling holes 192-1 and 192-1a partially or completely penetrate a thickness of the second coupling portion 192, and is spaced apart from outer edges of the second coupling portion 192, such that the coupling holes 192-1 and 192-1a are enclosed openings solely defined by the second coupling portion 192.

An end of the fixing portion 182 is spaced apart from the coupling portion 173-3 of the light source fixing board 173 when the fixing portion 182, the reinforcing portion 190 and the housing 180 are assembled together.

Table 2 below shows the effect of the reinforcing member 190 on rigidity of the LCD 101, according to the illustrated exemplary embodiment.

TABLE 2

|  | Comparative example 1 | Comparative example 2 | Example 1 |
|---|---|---|---|
| Displacement (mm) | 315 | 816 | 305 |

Comparative example 1 is the LCD 100 of FIG. 1, and Comparative example 2 is an LCD without the reinforcing member 190. The rigidity test method of Table 1 was used, and an external force of 100N was applied, unlike in Table 1.

Referring to Table 2, the displacement of the LCD 101 including the reinforcing member 190 according to the illustrated exemplary embodiment is equal to or smaller than that of the non-ultra-slim LCD 100 according to Comparative example 1, and is smaller than that of the LCD without the reinforcing member 190 according to Comparative example 2, by approximately 60% or more.

The results of Table 2 indicate that the reinforcing member 190 according to the illustrated exemplary embodiment has a significant effect on an increase in the rigidity of the frame, particularly, the corner portions of the frame of the ultra-slim LCD 101.

Since the single unitary indivisible reinforcing member 190 overlaps both the housing 180 and the light source module 170, when the fixing member (e.g., screw or rivet) is respectively engaged with the reinforcing member 190, the light source module 170 and the housing 180, solely the reinforcing member 190 fixes the light source module 170 to the housing 180.

Hereinafter, the liquid crystal display panel 120, the mold frame 130, the optical sheets 140, the reflective sheet 160, and the top cover 110 included in the LCD 101 according to the illustrated exemplary embodiment of the invention will be described in detail with reference to FIG. 3.

The liquid crystal display panel 120 includes a lower display substrate (not shown) including gate lines, data lines, a thin-film transistor ("TFT") array, pixel electrodes, and the like, an upper display substrate which faces the lower display substrate, and a liquid crystal layer which is interposed between the two display substrates. The liquid crystal display panel 120 displays image information by using white light provided by the backlight assembly 201 located thereunder.

The mold frame 130 consists of the quadrangular frame portion 131 and first to fourth side portions 132a through 132d which extend from an edge or a surface of the frame portion 131 in the direction of the bottom portion 181 of the housing 180, e.g., towards the rear of the LCD 101. The edges of the liquid crystal display panel 120 are placed on and contacting an upper surface of the frame portion 131 of the mold frame 130. Accordingly, the mold frame 130 supports the liquid crystal display panel 120. In addition, a lower surface of the frame portion 131 of the mold frame 130 contacts a topmost surface of the optical sheets 140 as a whole, thereby reducing or effectively preventing the movement of the optical sheets 140.

The reflective sheet 160 is positioned between the reflective surface 154 of the LGP 150 and the bottom portion 181 of the housing 180 to reflect light emitted from the reflective surface 154 of the LGP 150 in an upward direction, e.g., towards a front of the LCD 101. The reflective sheet 160 reflects light which has failed to be reflected by, for example, diffusion patterns on the reflective surface 154 of the LGP 150, thereby reducing the loss of light that is to be incident on the liquid crystal display panel 120, while improving the uniformity of light that passes through the output surface 153 of the LGP 150.

The reflective sheet 160 may include polyethylene terephthalate ("PET"). In an exemplary embodiment, a surface of the reflective sheet 160 may be coated with a diffusion layer containing, e.g., titanium dioxide. When the titanium dioxide dries and settles, it forms a frost-like white surface which diffuses light more uniformly and offers a certain reflection effect.

The optical sheets 140 are placed on the LGP 150 to diffuse and concentrate light received from the LGP 150. The optical sheets 140 may include a diffusion sheet, a prism sheet, a reflective polarizing sheet, a protective sheet, and the like. The diffusion sheet located between the LGP 150 and the prism sheet diffuses light incident from the LGP 150, thereby reducing or effectively preventing concentration of the light in a specific area. The prism sheet includes a predetermined array of triangular prisms on an upper surface thereof. The prism sheet typically includes two separate sheets, and an array of triangular prisms on one of the two prism sheets cross an array of triangular prisms on the other one of the two prism sheets at a predetermined angle, so that light diffused by the diffusion sheet can be concentrated in a direction perpendicular to the liquid crystal display panel 120. Accordingly, most of light that pass through the prism sheet proceeds vertically, resulting in uniform luminance distribution on the protective sheet.

The reflective polarizing sheet on the prism sheet polarizes and reflects light having a predetermined phase to increase the luminance of the light provided to the liquid crystal display panel 120. The reflective polarizing sheet not only protects the surface of the prism sheet but also diffuses light for uniform distribution of the light.

The top cover 110 may consist of an aperture which corresponds to an image display area of the liquid crystal display panel 120, a quadrangular frame portion 111, and the side portions 112 which extend from edges of the frame portion 111 and are coupled to the fixing portions 182 and 183 of the housing 180. Part of a surface of the frame portion 111 overlaps edges of the upper display substrate of the liquid crystal display panel 120 to support the liquid crystal display panel 120.

While the invention has been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:
1. A backlight assembly comprising:
a light source module comprising:
    a light guide member;
    a plurality of first point light sources which is disposed adjacent to a first side of the light guide member,
    a support portion which is elongated in a first direction and fixes the first point light sources in place,
    a base portion which extends from an edge of the support portion and is overlapped by the light guide member, and an extension portion which is adjacent to a corner of the light guide member, and extends in the first direction from an end of the base portion and further than an end of the support portion;
a housing comprising:
a bottom portion which supports the light guide member;
a fixing portion which extends from an edge of the bottom portion, the fixing portion comprising:
a first bent portion which extends from the edge of the bottom portion in the direction perpendicular to the bottom portion,
a second bent portion which is parallel to and faces the first bent portion, and
a first connecting portion which connects the first bent portion to the second bent portion; and
a reinforcing member which is coupled and fixed to each of the extension portion of the light source module and the fixing portion of the housing, and disposed between the extension portion of the light source module and the fixing portion of the housing in a direction perpendicular to the bottom portion, the reinforcing member comprising:
a first coupling portion which is coupled directly to the extension portion of the light source module; and
a second coupling portion which extends from an end of the first coupling portion, directly coupled to the first connecting portion of the fixing portion, the second coupling portion comprising:
a second connecting portion which extends directly from an end of the first coupling portion; and
a third bent portion and a fourth bent portion which respectively extend from edges of the second connecting portion in a direction of the bottom portion of the housing, and are parallel to each other.

2. The backlight assembly of claim 1, wherein the extension portion of the light source module is connected to the first connecting portion of the fixing portion of the housing, by the reinforcing member.

3. The backlight assembly of claim 1, wherein outer surfaces of the third bent portion and the fourth bent portion of the second coupling portion respectively contact inner surfaces of the first bent portion and the second bent portion of the fixing portion of the housing, such that a portion of the fixing portion surrounds a portion of the reinforcing member.

4. The backlight assembly of claim 1,
wherein
the reinforcing member comprises a plurality of a coupling hole,
the light source module comprises a plurality of a first through hole; and
the fixing portion of the housing comprises a plurality of a second through hole; and
wherein the coupling holes, the first through holes and the second through holes are respectively aligned with each other, such that a fixing member extends through an aligned coupling hole, first through hole and second through hole.

5. The backlight assembly of claim 4, wherein the fixing member in the coupling holes is a screw or a rivet.

6. The backlight assembly of claim 1, further comprising a plurality of a second point light source disposed adjacent to a second side of the light guide member which faces the first side of the light guide member.

7. The backlight assembly of claim 1,
wherein the base portion of the light source module comprises a step part which protrudes in a direction of the light guide member, and
wherein the step part includes an insertion groove indented into a side surface thereof, such that an edge of the bottom portion of the housing is in the insertion groove.

8. The backlight assembly of claim 1, wherein the fixing portion of the housing is connected directly to a short side of the bottom portion of the housing.

9. AT backlight assembly comprising:
a light source module comprising:
a light guide member;
a plurality of first point light sources which is disposed adjacent to a first side of the light wide member,
a support portion which is elongated in a first direction and fixes the first point light sources in place,
a base portion which extends from an edge of the support portion and is overlapped by the light guide member, and
an extension portion which is adjacent to a corner of the light guide member, and extends in the first direction from an end of the base portion and further than an end of the support portion;
a housing comprising:
a bottom portion which supports the light guide member; and
a fixing portion which extends from an edge of the bottom portion; and
a reinforcing member which is coupled and fixed to each of the extension portion of the light source module and the fixing portion of the housing, and disposed between the extension portion of the light source module and the fixing portion of the housing in a direction perpendicular to the bottom portion,
wherein an entire surface of the bottom portion of the housing includes protrusions and recesses.

10. A backlight assembly comprising:
a light source module comprising:
a plurality of point light sources on a support portion elongated in a first direction, and
a light source fixing board which extends further than an end of the support portion, in the first direction, and includes the point light sources thereon;
a housing comprising;
a bottom portion overlapping the light source fixing board, and
a fixing portion which extends from an edge of the bottom portion and is fixed to the light source fixing board, the fixing portion comprising:
a first bent portion which extends from the edge of the bottom portion in the direction perpendicular to the bottom portion,
a second bent portion which is parallel to and faces the first bent portion, and
a first connecting portion which connects the first bent portion to the second bent portion; and
a reinforcing member which is disposed adjacent to at least one corner of the housing, interposed between the light source fixing board and the housing in a direction perpendicular to the bottom portion, coupled and fixed to each of the light source fixing board and the housing, the reinforcing member comprising:
a first coupling portion which is coupled to the light source fixing board; and a second coupling portion which extends from an end of the first coupling portion, coupled to the first connecting portion of the fixing member, the second coupling portion comprising:
 a second connecting portion which extends directly from an end of the first coupling portion; and
 a third bent portion and a fourth bent portion which respectively extend from edges of the second connecting portion in a direction of the bottom portion of the housing, and are parallel to each other.

11. The backlight assembly of claim 10, wherein the light source fixing board comprises:
the support portion which fixes the point light sources in place,
a base portion which extends from an edge of the support portion and is overlapped by a light guide member of the light source module, and
an extension portion which is adjacent to a corner of the light guide member, and extends in the first direction from an end of the base portion and further than the end of the support portion.

12. A liquid crystal display comprising:
a backlight assembly providing light; and
a liquid crystal display panel disposed on the backlight assembly and displaying an image by using the light,
wherein the backlight assembly comprises:
 a light source module comprising:
  a light guide member,
  a plurality of a point light source which is disposed adjacent to a side of the light guide member,
  a support portion which is elongated in a first direction and fixes the point light sources in place,
  a base portion which extends from an edge of the support portion and is overlapped by the light guide member, and
  an extension portion which is adjacent to a corner of the light guide member, and extends in the first direction from an end of the base portion and further than an end of the support portion;
 a housing comprising;
  a bottom portion which supports the light guide member, and
  a fixing portion which extends from an edge of the bottom portion, the fixing portion comprising:
   a first bent portion which extends from the edge of the bottom portion in the direction perpendicular to the bottom portion,
   a second bent portion which is parallel to and faces the first bent portion, and
   a first connecting portion which connects the first bent portion to the second bent portion; and
 a single unitary indivisible reinforcing member which is coupled and fixed to each of the extension portion of the light source module and the fixing portion of the housing, disposed between the extension portion of the light source module and the fixing portion of the housing in a direction perpendicular to the bottom portion, the single unitary indivisible member comprising:
  a first coupling portion which is coupled to the light source fixing board; and
  a second coupling portion which extends from an end of the first coupling portion, coupled to the first connecting portion of the housing, the second coupling portion comprising:
   a second connecting portion which extends directly from an end of the first coupling portion; and
   a third bent portion and a fourth bent portion which respectively extend from edges of the second connecting portion in a direction of the bottom portion of the housing, and are parallel to each other.

13. The liquid crystal display of claim 12, wherein
the single unitary indivisible reinforcing member overlaps both the extension portion of the light source module and the fixing portion of the housing;
the extension portion of the light source module includes a first through hole;
the fixing portion of the housing includes a second through hole;
the single unitary indivisible reinforcing member includes a third through hole and a fourth through hole; and
the first and third through holes are aligned with each other, and the second and fourth through holes are aligned with each other, when the single unitary indivisible reinforcing member coupled and fixed to each of the extension portion of the light source module and the fixing portion of the housing.

* * * * *